US012784989B2

(12) United States Patent
Iguchi

(10) Patent No.: US 12,784,989 B2
(45) Date of Patent: Nov. 3, 2026

(54) MULTILAYER ELECTRONIC COMPONENT

(71) Applicant: TDK Corporation, Tokyo (JP)

(72) Inventor: Toshihiro Iguchi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 163 days.

(21) Appl. No.: 18/966,882

(22) Filed: Dec. 3, 2024

(65) Prior Publication Data

US 2025/0259794 A1 Aug. 14, 2025

(30) Foreign Application Priority Data

Feb. 14, 2024 (JP) ................................ 2024-020567

(51) Int. Cl.
*H01G 4/30* (2006.01)
*H01G 4/012* (2006.01)

(52) U.S. Cl.
CPC ............... *H01G 4/30* (2013.01); *H01G 4/012* (2013.01)

(58) Field of Classification Search
CPC ................................ H01G 4/012; H01G 4/30
See application file for complete search history.

(56) References Cited

U.S. PATENT DOCUMENTS

2022/0406527 A1* 12/2022 Hirai ........................ H01G 4/30
2022/0406528 A1* 12/2022 Hirai ...................... H01G 4/232

FOREIGN PATENT DOCUMENTS

JP 2015082636 A * 4/2015
JP 2016-160133 A 9/2016

* cited by examiner

*Primary Examiner* — David M Sinclair
(74) *Attorney, Agent, or Firm* — Oliff PLC

(57) ABSTRACT

A multilayer electronic component includes a plurality of dielectric layers, and a plurality of electrode layers stacked alternately with the plurality of dielectric layers along a stacking direction. A skewness of area equivalent circle diameters of a plurality of electrode discontinuity portions formed in the electrode layers on a plane intersecting the stacking direction is 1 or more and 2 or less.

5 Claims, 12 Drawing Sheets

Fig.11A

| | RATIO OF DISCONTINUITY PORTIONS | SKEWNESS OF AREA EQUIVALENT CIRCLE DIAMETER OF DISCONTINUITY PORTIONS | ELECTROSTATIC CAPACITANCE | CRACK |
|---|---|---|---|---|
| COMPARATIVE EXAMPLE 1 | 0.00 | — | 1.00 | 22/100 |
| COMPARATIVE EXAMPLE 2 | 0.12 | 0.80 | 0.98 | 17/100 |
| EXAMPLE 1 | 0.10 | 1.17 | 0.97 | 0/100 |
| EXAMPLE 2 | 0.11 | 1.57 | 0.96 | 0/100 |
| EXAMPLE 3 | 0.11 | 1.88 | 0.96 | 0/100 |
| COMPARATIVE EXAMPLE 3 | 0.09 | 2.33 | 0.88 | 0/100 |

Fig.11B

| | RATIO OF DISCONTINUITY PORTIONS | SKEWNESS OF AREA EQUIVALENT CIRCLE DIAMETER OF DISCONTINUITY PORTIONS | MEDIAN VALUE OF AREA EQUIVALENT CIRCLE DIAMETER OF DISCONTINUITY ORTIONS [μm] | ELECTROSTATIC CAPACITANCE | CRACK |
|---|---|---|---|---|---|
| EXAMPLE 4 | 0.09 | 1.40 | 0.42 | 0.99 | 0/100 |
| EXAMPLE 5 | 0.10 | 1.48 | 0.62 | 0.97 | 0/100 |
| EXAMPLE 6 | 0.11 | 1.57 | 1.11 | 0.96 | 0/100 |
| EXAMPLE 7 | 0.08 | 1.49 | 1.42 | 0.95 | 0/100 |
| EXAMPLE 8 | 0.09 | 1.63 | 1.68 | 0.93 | 0/100 |

*Fig.12A*

| | RATIO OF DISCONTINUITY PORTIONS | SKEWNESS OF AREA EQUIVALENT CIRCLE DIAMETER OF DISCONTINUITY PORTIONS | STANDARD DEVIATION OF AREA EQUIVALENT CIRCLE DIAMETER OF DISCONTINUITY PORTIONS [μm] | ELECTROSTATIC CAPACITANCE | CRACK 1 | CRACK 2 |
|---|---|---|---|---|---|---|
| EXAMPLE 9 | 0.09 | 1.48 | 0.25 | 0.99 | 0/100 | 4/100 |
| EXAMPLE 10 | 0.10 | 1.34 | 0.38 | 0.97 | 0/100 | 0/100 |
| EXAMPLE 11 | 0.10 | 1.55 | 1.41 | 0.95 | 0/100 | 0/100 |
| EXAMPLE 12 | 0.11 | 1.52 | 1.7 | 0.93 | 0/100 | 0/100 |

*Fig.12B*

| | RATIO OF DISCONTINUITY PORTIONS | SKEWNESS OF AREA EQUIVALENT CIRCLE DIAMETER OF DISCONTINUITY PORTIONS | ELECTROSTATIC CAPACITANCE | CRACK 1 | CRACK 2 |
|---|---|---|---|---|---|
| EXAMPLE 13 | 0.04 | 1.54 | 0.99 | 0/100 | 11/100 |
| EXAMPLE 14 | 0.06 | 1.62 | 0.97 | 0/100 | 0/100 |
| EXAMPLE 15 | 0.14 | 1.32 | 0.95 | 0/100 | 0/100 |
| EXAMPLE 16 | 0.18 | 1.48 | 0.92 | 0/100 | 0/100 |

MULTILAYER ELECTRONIC COMPONENT

TECHNICAL FIELD

An aspect of the present disclosure relates to a multilayer electronic component.

BACKGROUND

Japanese Unexamined Patent Publication No. 2016-160133 discloses a multilayer ceramic capacitor that is a kind of a multilayer electronic component. The multilayer ceramic capacitor described in Japanese Unexamined Patent Publication No. 2016-160133 has a configuration in which dielectric layers and inner electrode layers are stacked alternately.

SUMMARY

Problem to be Solved by the Invention

An object of an aspect of the present disclosure is to provide a multilayer electronic component capable of suppressing occurrence of cracks while suppressing a decrease in electrostatic capacitance.

Means to Solve the Problem

A multilayer electronic component according to an aspect of the present disclosure is [1] "A multilayer electronic component including a plurality of dielectric layers and a plurality of electrode layers stacked alternately with the plurality of dielectric layers along a stacking direction, wherein a skewness of a distribution of area equivalent circle diameters of a plurality of electrode discontinuity portions formed in the electrode layer on a plane intersecting the stacking direction is 1 or more and 2 or less".

In the multilayer electronic components, the skewness of the distribution of the area equivalent circle diameters of the plurality of electrode discontinuity portions (voids, air gaps) (hereinafter, also referred to simply as discontinuity portions) formed in the electrode layer is 1 or more and 2 or less. That is, many small discontinuity portions and a few large discontinuity portions are formed in the electrode layers. In a case where the discontinuity portions are formed in the electrode layers, a stress that occurs during firing due to a difference in linear expansion coefficient between the dielectric layers and the electrode layers may be mitigated, and occurrence of cracks may be suppressed. In a case where the discontinuity portions are small, since an influence of a stray capacitance is relatively large, an electrostatic capacitance is less likely to decrease significantly, but a stress mitigation effect is relatively small. On the other hand, in a case where the discontinuity portions are large, since the influence of the stray capacitance is relatively small, the electrostatic capacitance may decrease, but the stress mitigation effect is relatively large. In the multilayer electronic component, since many small discontinuity portions and a few large discontinuity portions are formed in the electrode layers, it is possible to suppress occurrence of cracks while suppressing a decrease in electrostatic capacitance.

The multilayer electronic component according to an aspect of the present disclosure may be [2] "The multilayer electronic component according to [1], wherein a median value of the area equivalent circle diameters of the plurality of discontinuity portions is 1.5 μm or less". In this case, it is possible to arrange many small discontinuity portions in the electrode layers, and it is possible to effectively suppress a decrease in electrostatic capacitance.

The multilayer electronic component according to an aspect of the present disclosure may be [3] "The multilayer electronic component according to [1], wherein a median value of the area equivalent circle diameters of the plurality of discontinuity portions is 0.5 μm or less". In this case, it is possible to arrange many small discontinuity portions in the electrode layers, and it is possible to effectively suppress a decrease in electrostatic capacitance.

The multilayer electronic component according to an aspect of the present disclosure may be [4] "The multilayer electronic component according to any one of [1] to [3], wherein a standard deviation of the area equivalent circle diameters of the plurality of discontinuity portions is 0.3 or more and 1.5 μm or less". In this case, when the standard deviation is 0.3 μm or more, it is possible to reliably suppress occurrence of cracks. In addition, when the standard deviation is 1.5 μm or less, it is possible to reliably suppress a decrease in electrostatic capacitance.

The multilayer electronic component according to an aspect of the present disclosure may be [5] "The multilayer electronic component according to any one of [1] to [4], wherein a ratio of the plurality of discontinuity portions to an area of the electrode layer on the plane is 5% or more and 15% or less". In this case, when the ratio is 5% or more, it is possible to reliably suppress occurrence of cracks. In addition, when the ratio is 15% or less, it is possible to reliably suppress a decrease in electrostatic capacitance.

According to an aspect of the present disclosure, it is possible to provide a multilayer electronic component capable of suppressing occurrence of cracks while suppressing a decrease in electrostatic capacitance.

BRIEF DESCRIPTION OF THE DRAWINGS

FIG. 11A is a table showing results of a first experiment, and FIG. 11B is a table showing results of a second experiment.

FIG. 12A is a table showing results of a third experiment, and FIG. 12B is a table showing results of a fourth experiment.

DETAILED DESCRIPTION

Figure 1:
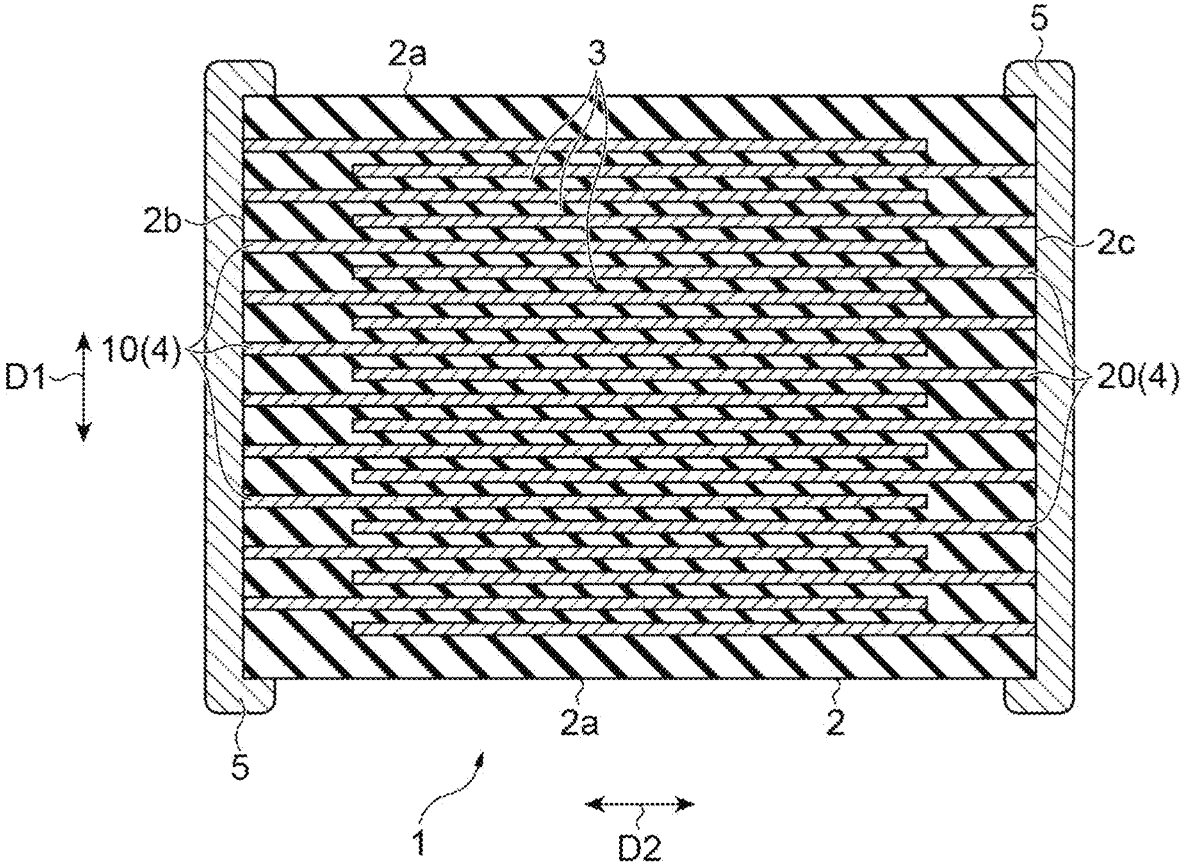
FIG. 1 is a cross-sectional view of a multilayer electronic component of an embodiment.

Hereinafter, an embodiment of the present disclosure will be described in detail with reference to the accompanying drawings. In the following description, the same reference numeral will be given to the same or equivalent element, and redundant description will be omitted.

Multilayer Electronic Component

FIG. 1 shows a multilayer electronic component 1 that is a multilayer ceramic capacitor. The multilayer electronic component 1 includes an element body 2. The element body 2 is formed, for example, in an approximately rectangular parallelepiped shape. The element body 2 has a pair of main surfaces 2*a*, a first side surface 2*b*, and a second side surface 2*c*. The pair of main surfaces 2*a* face each other in a first direction D1. The first side surface 2*b* and the second side surface 2*c* face each other in a second direction D2 orthogonal to the first direction D1. One of the main surfaces 2*a* constitutes a mounting surface. The multilayer electronic component 1 is mounted, for example, on a mounting target (for example, an electronic component, a substrate, or the like) by soldering the multilayer electronic component 1 on the one main surface 2*a*. The multilayer electronic component 1 is, for example, an in-vehicle multilayer electronic component that is used in a state of being mounted on a vehicle.

The element body 2 includes a plurality of dielectric layers 3 and a plurality of electrode layers 4. The plurality of electrode layers 4 include a plurality of first electrode layers 10 and a plurality of second electrode layers 20. Each of the dielectric layers 3 consists of a sintered body of a ceramic green sheet (dielectric sheet) containing, for example, a dielectric material (dielectric ceramic such as $BaTiO_3$-based, $Ba(Ti,Zr)O_3$-based, $(Ba,Ca)TiO_3$-based, $CaZrO_3$-based, $(Ca,Sr)(Zr,Ti)O_3$-based, or the like). In the actual element body 2, the dielectric layers 3 adjacent to each other are integrated to such an extent that a boundary between the dielectric layers 3 cannot be visually recognized. The average thickness of the plurality of dielectric layers 3 is, for example, 10 μm or less, and in this example, 0.4 μm or less. The element body 2 includes, for example, at least 10 layers or 20 layers or more of dielectric layers 3.

The plurality of dielectric layers 3 and the plurality of electrode layers 4 are stacked alternately along the first direction D1 (stacking direction). In this example, the plurality of first electrode layers 10 and the plurality of second electrode layers 20 are arranged alternately to face each other through the dielectric layers 3 in the first direction D1. The first electrode layer 10 extends to reach the first side surface 2*b* of the element body 2, and the second electrode layers 20 extend to reach the second side surface 2*c* of the element body 2.

For example, the electrode layers 4 are formed from a conductive material such as Ni, Cu, Ag, Pd, alloys thereof, or the like. The electrode layers 4 consist of, for example, a sintered body of a conductive paste (conductive layer) containing the conductive material. The electrode layers 4 function as inner electrodes disposed inside the element body 2. The first electrode layers 10 and the second electrode layers 20 have polarities different from each other. In the multilayer electronic component 1, since each of the first electrode layers 10 and each of the second electrode layers 20 faces each other, electrostatic capacitance is formed.

The multilayer electronic component 1 further includes a pair of external electrodes 5 electrically connected to an object to be mounted. The pair of external electrodes 5 are formed on the first side surface 2*b* and the second side surface 2*c* of the element body 2. One of the external electrodes 5 is electrically connected to the first electrode layers 10 at the first side surface 2*b*, and the other external electrode 5 is electrically connected to the second electrode layers 20 at the second side surface 2*c*.

Method of Manufacturing Multilayer Electronic Component

When manufacturing the multilayer electronic component 1, first, a plurality of dielectric sheets are prepared (preparation process). The dielectric sheets are ceramic members which become the dielectric layers 3 after firing. Next, the plurality of dielectric sheets and the plurality of conductive layers are stacked alternately (stacking process). The conductive layers are layers which become the electrode layers 4 after firing, and consist of, for example, a conductive paste.

Next, a stacked body obtained by the stacking process is pressurized in the first direction D1 (pressurizing process). Adjacent layers are integrated due to the pressurizing process, and chips having a predetermined size can be obtained. Note that, the stacked body having a plurality of portions that will become chips after cutting may be pressurized in the pressurizing process, and then the stacked body may be cut out to obtain a plurality of chips having a predetermined size. Next, each of the chips is fired to obtain the element body 2. Then, a process of providing the external electrodes 5 on the outer surface of the element body 2 is performed, and the multilayer electronic component 1 is obtained.

Electrode Discontinuity Portion

Figure 2C:
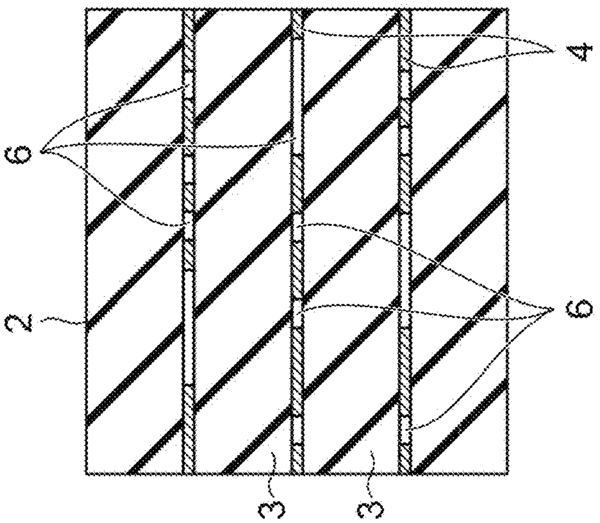
FIG. 2C is a cross-sectional view illustrating a case where many small electrode discontinuity portions and a few large electrode discontinuity portions are formed.

As illustrated in FIG. 2C, in the multilayer electronic component 1 of this embodiment, a plurality of electrode discontinuity portions 6 (hereinafter, also referred to simply as discontinuity portions 6) in each of the electrode layers 4. The discontinuity portions 6 are gaps where the electrode layer 4 is discontinued, and consist of, for example, voids (air). As illustrated in the following FIG. 4 and FIG. 5, the plurality of discontinuity portions 6 are formed to be spaced apart from one another, and have non-uniform (random) shapes. In the multilayer electronic component 1, the skewness of the distribution of the area equivalent circle diameters of the plurality of discontinuity portions 6 formed in the electrode layer 4 is 1 or more and 2 or less. This point will be described below.

As described above, when manufacturing the multilayer electronic component 1, the ceramic members which will become the dielectric layers 3 after firing and the conductive layers which will become the electrode layers 4 after firing are fired simultaneously after being formed into chips. At this time, since the dielectric layers 3 (ceramic members) and the electrode layers 4 (conductive layers) have linear expansion coefficients different from each other, a stress is generated when the layers are fired and cooled simultaneously. This stress may cause cracks to occur. Therefore, in the multilayer electronic component 1 of this embodiment, the discontinuity portions 6 are formed in the electrode layer 4 having a linear expansion coefficient larger than that of the dielectric layer 3 so as to mitigate the stress.

Figure 2B:
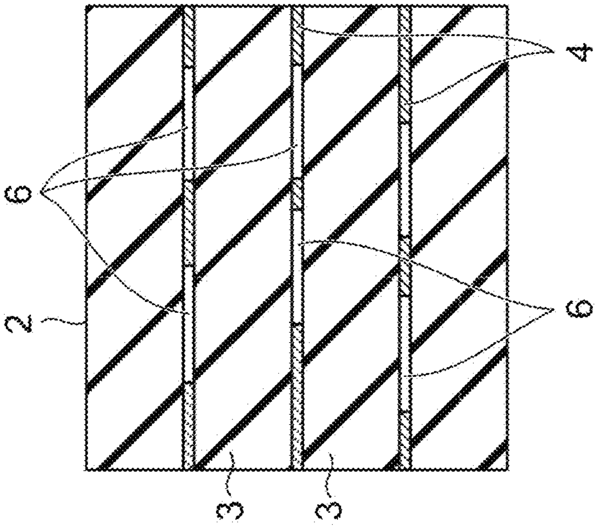
FIG. 2B is a cross-sectional view illustrating a case where the electrode discontinuity portions are large.
Figure 2A:
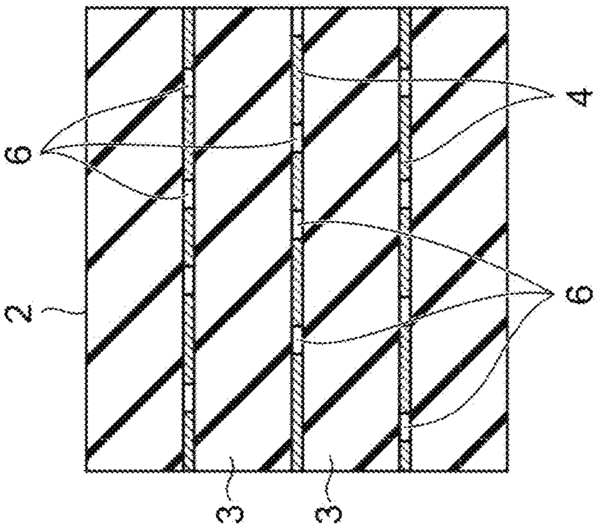
FIG. 2A is a cross-sectional view illustrating a case where electrode discontinuity portions are small.
Figure 3:
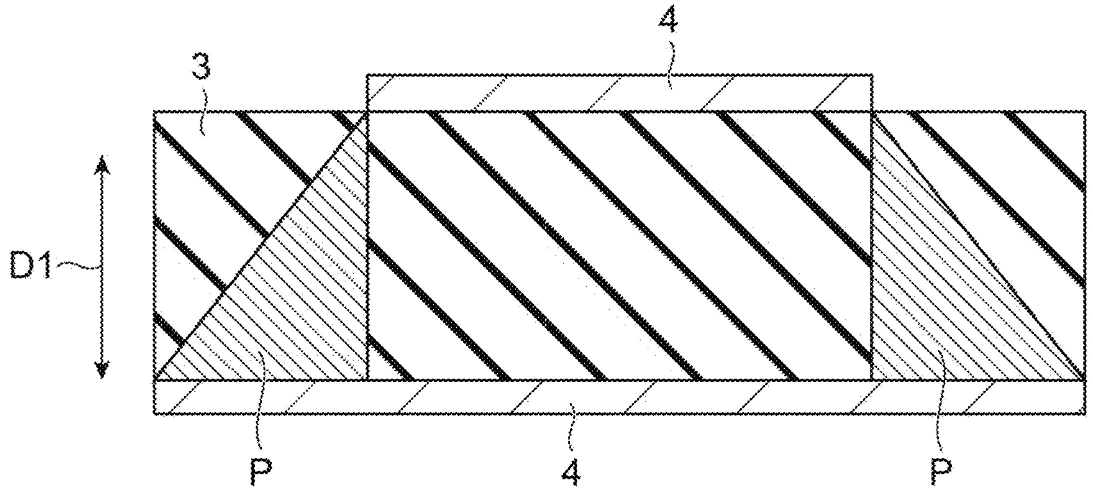
FIG. 3 is a view for explaining a stray capacitance.

FIG. 2A a cross-sectional view illustrating a case where the discontinuity portions 6 are small, and FIG. 2B is a cross-sectional view illustrating a case where the discontinuity portions 6 are large. FIG. 2C is a cross-sectional view illustrating a case where many small discontinuity portions 6 and a few large discontinuity portions 6 are formed. In the multilayer electronic component 1 of this embodiment, the discontinuity portions 6 are formed as shown in FIG. 2C. FIG. 3 is a view for explaining stray capacitance.

In a case where the discontinuity portions 6 are small as shown in FIG. 2A, since an influence of the stray capacitance is relatively large, the electrostatic capacitance is less likely to decrease significantly. However, since the discontinuity portions 6 are small, a stress mitigation effect is relatively small. The stray capacitance is a capacitance generated by a portion P hatched in FIG. 3. As shown in FIG. 3, in a case where a pair of the electrode layers 4 are arranged to face each other in the first direction D1 and one of the electrode layers 4 is discontinuous (sizes of the pair of electrode layers 4 are different from each other), not only a capacitance due to the pair of electrode layers 4 facing each other in the first direction D1, but also a capacitance due to the pair of electrode layers 4 facing each other in a direction oblique to the first direction D1 is generated. Here, the latter is referred to as the stray capacitance.

In a case where the discontinuity portions 6 are large as illustrated in FIG. 2B, since an influence of the stray capacitance becomes relatively small, the electrostatic capacitance may decrease. On the other hand, since the electrode layer 4 can be largely discontinued, the stress mitigation effect is relatively large. In this way, there are advantages and disadvantages in either of the cases where the discontinuity portions 6 are small and the case where the discontinuity portions 6 are large. In contrast, in the multilayer electronic component 1 of the embodiment, many small discontinuity portions 6 and a few large discontinuity portions 6 are formed in the electrode layers 4 as shown in FIG. 2C, thereby achieving both suppression of the decrease in electrostatic capacitance and suppression of the occurrence of cracks.

Figure 4:
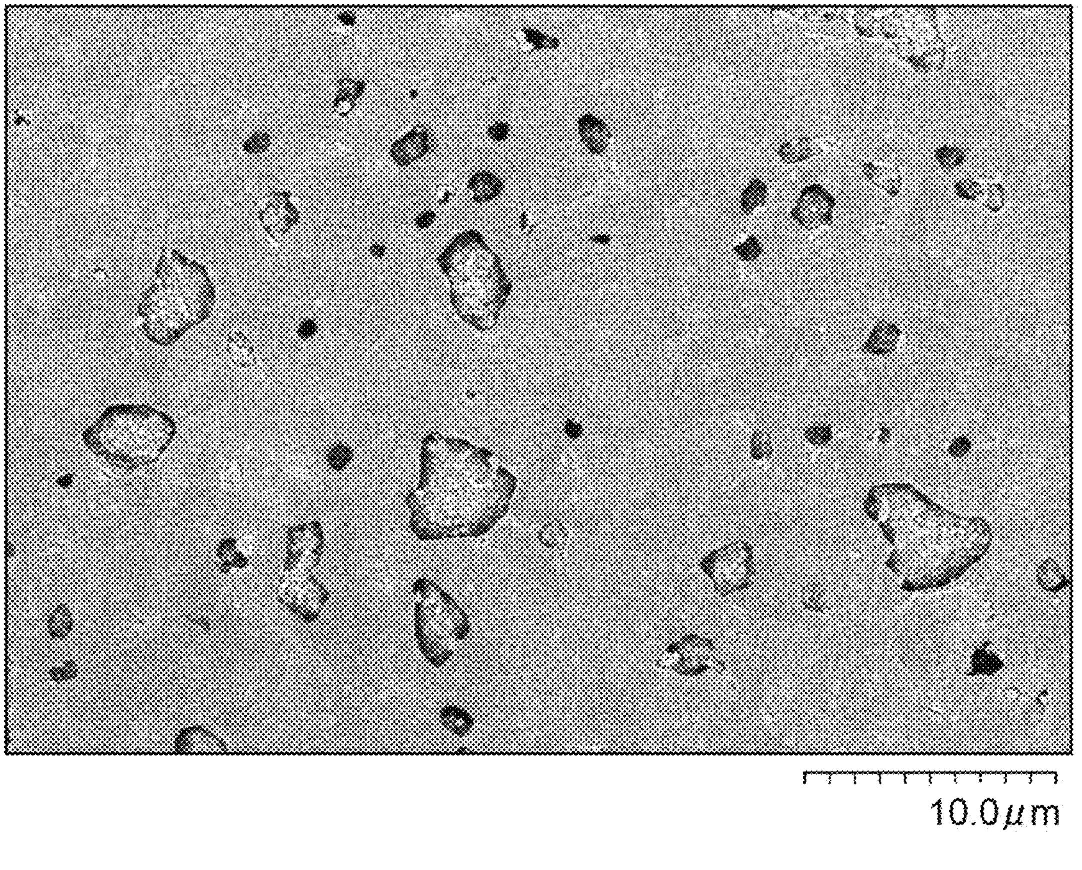
FIG. 4 is a view illustrating an observation surface of a first sample.
Figure 5:
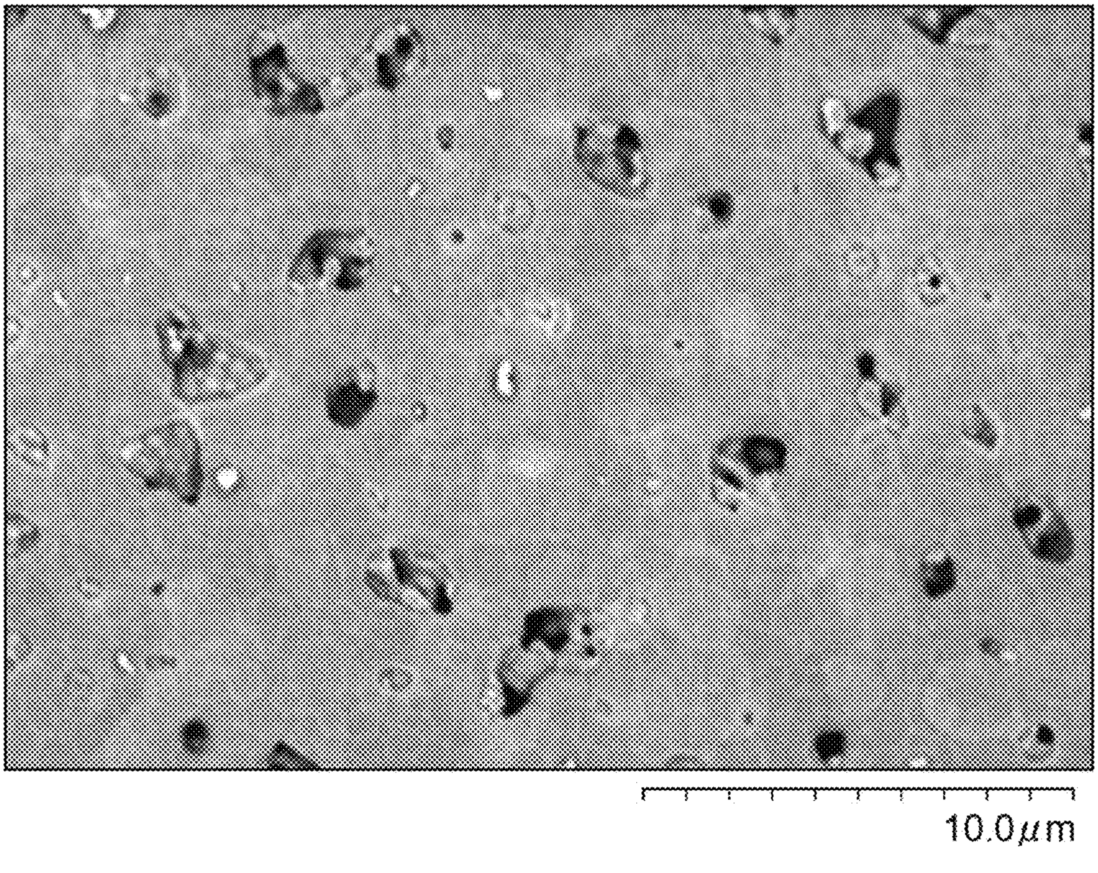
FIG. 5 is a view illustrating an observation surface of a second sample.

FIG. 4 is a view illustrating an observation surface of a first sample of the multilayer electronic component 1, and FIG. 5 is a view illustrating an observation surface of a second sample of the multilayer electronic component 1. The first sample and the second sample are different from each other in a material of the dielectric layers 3. A material of the electrode layers 4 is set to a material mainly containing Ni.

In the example, a boundary surface between each of the dielectric layers 3 and each of the electrode layers 4 is set as an observation surface. The boundary surface (fracture surface) was formed by the following method. First, Galinstan (liquid metal) was applied to the side surface of the element body 2 (base material) before the external electrodes 5 were provided. A voltage was applied to the element body 2 at 100 V/sec and 10 mA in a form of a DC breakdown voltage test by using a withstand voltage tester (THK-2011ADMPT manufactured by TAMADENSOKU CO., LTD.). As a result, insulation breakdown occurred at 0.64 kV in the first sample and at 0.30 kV in the second sample, and peeling occurred at the boundary surface between the dielectric layer 3 and the electrode layer 4 in both samples. Note that, in a case where the external electrodes 5 are already provided on the outer surface of the element body 2, the external electrodes 5 can be removed with waterproof abrasive paper or the like and then treated in the same manner to separate the dielectric layer 3 and the electrode layer 4 at the boundary surface.

Next, Pt was sputtered onto an exposed surface (observation surface) of the electrode layer 4 at 20 mA for 20 seconds by using an autofine coater (JFC-1600, manufactured by JEOL Ltd.). FIG. 4 and FIG. 5 show results of observing a secondary electron image of the observation surface by using a scanning electron microscope (S-4800, manufactured by Hitachi High-Tech Co., Ltd.).

Figure 6:
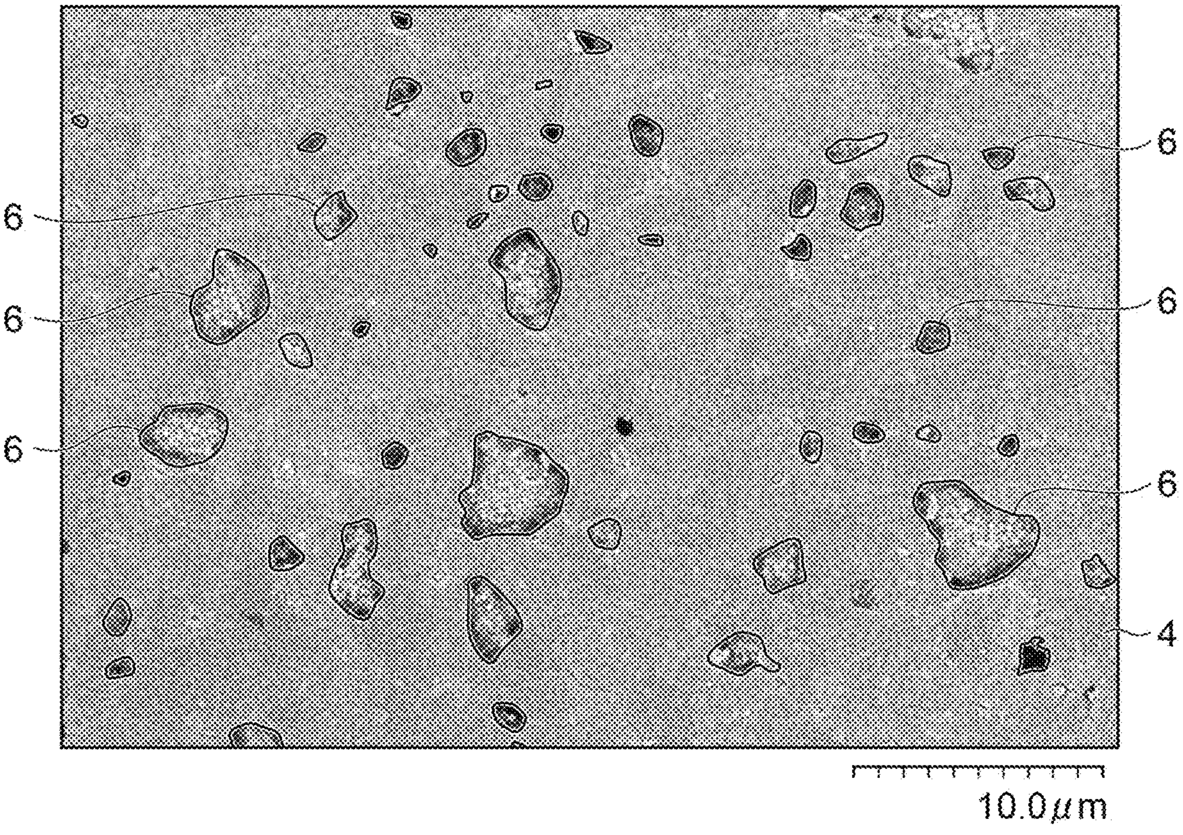
FIG. 6 is a view illustrating electrode discontinuity portions on the observation surface of the first sample.
Figure 7:
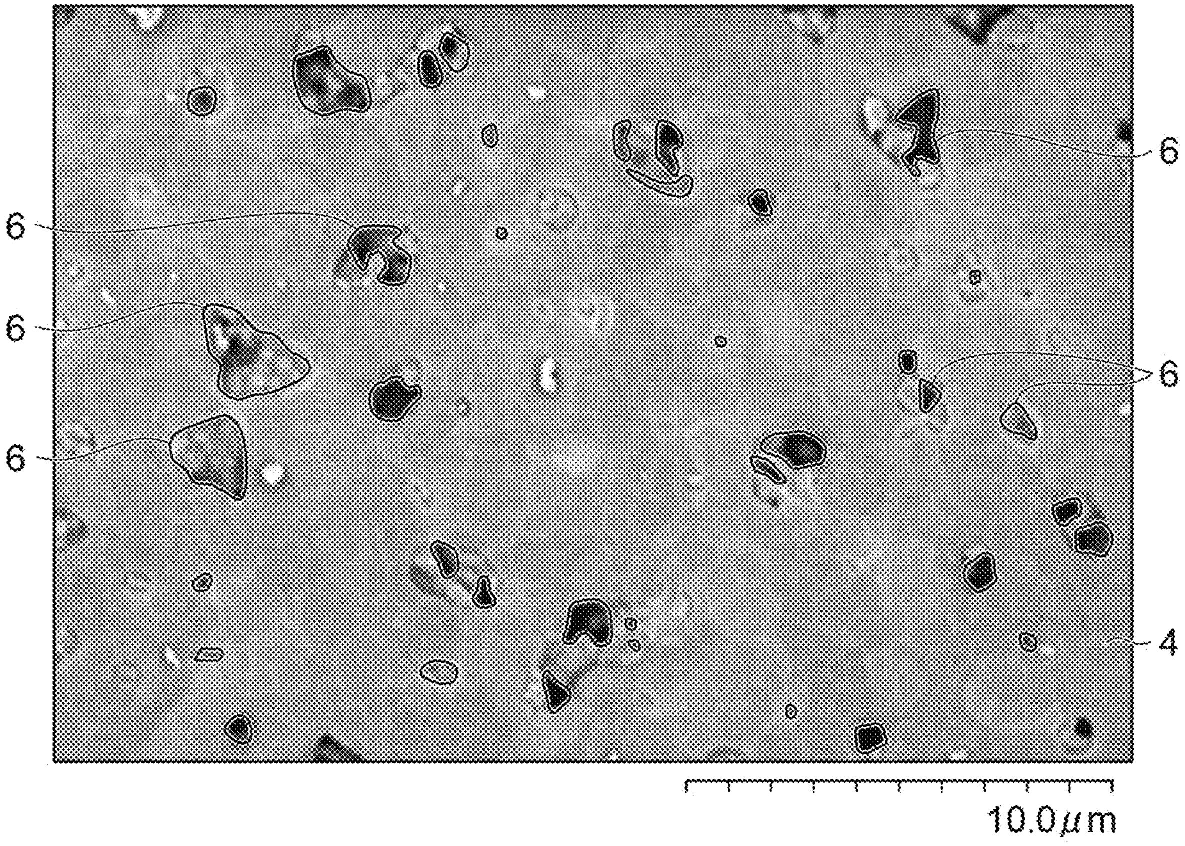
FIG. 7 is a view illustrating electrode discontinuity portions on the observation surface of the second sample.

Next, in the obtained image of the observation surface, locations where the electrode layer 4 was discontinued were specified as the discontinuity portions 6. In FIG. 6 and FIG. 7, the specified discontinuity portions 6 are shown in a state of being surrounded by lines. In this example, the specifying was performed by visual observation, but may also be performed by using recognition software. Next, an area equivalent circle diameters of the discontinuity portions 6 was measured by using measurement software (MAC-View version 4, manufactured by Mountech Co., Ltd.). The area equivalent circle diameter of the discontinuity portion 6 is a diameter of perfect circle equivalent to the area of the discontinuity portion 6.

Figure 8:
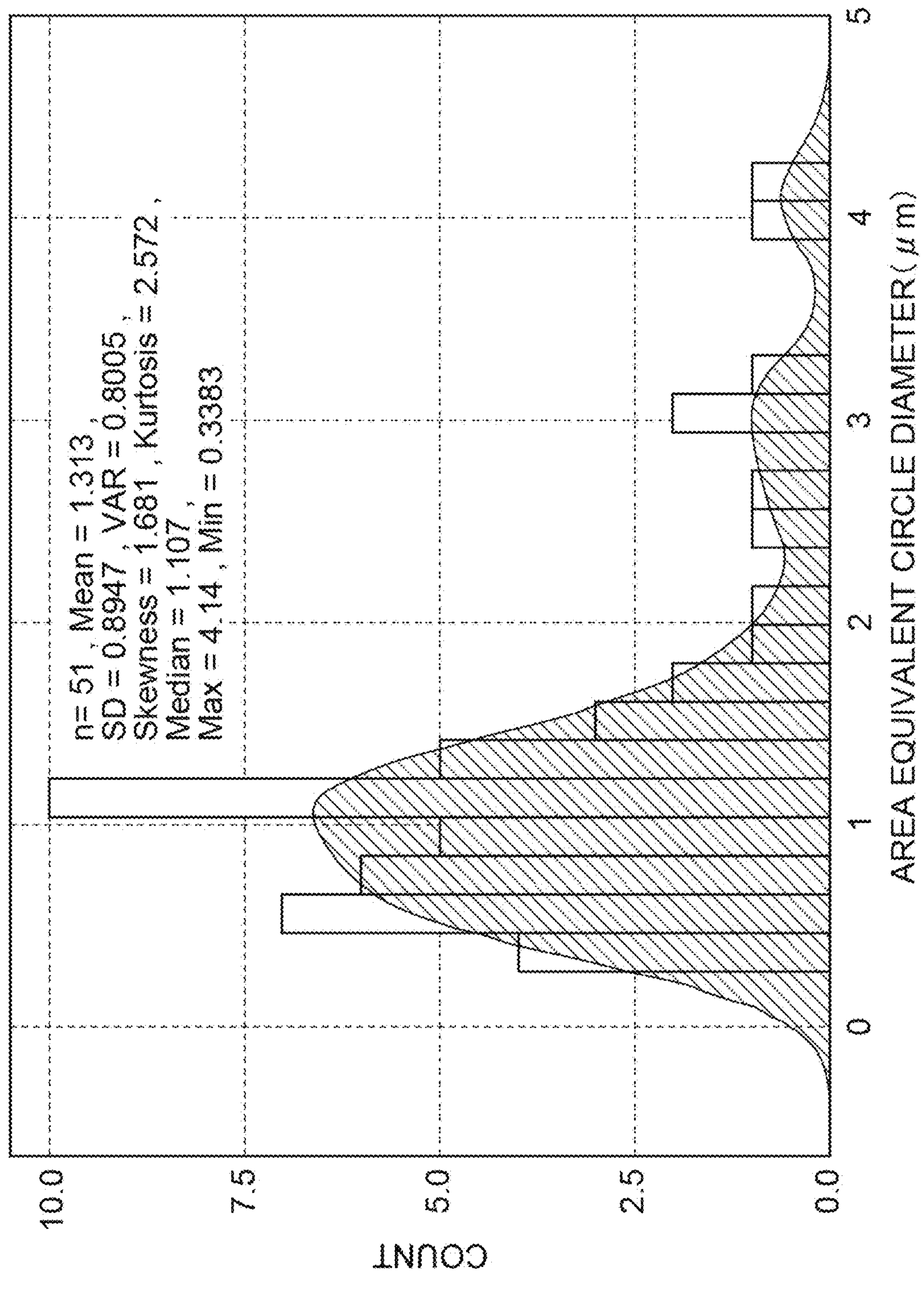
FIG. 8 is a view illustrating a distribution of area equivalent circle diameters of the electrode discontinuity portions in the first sample.
Figure 9:
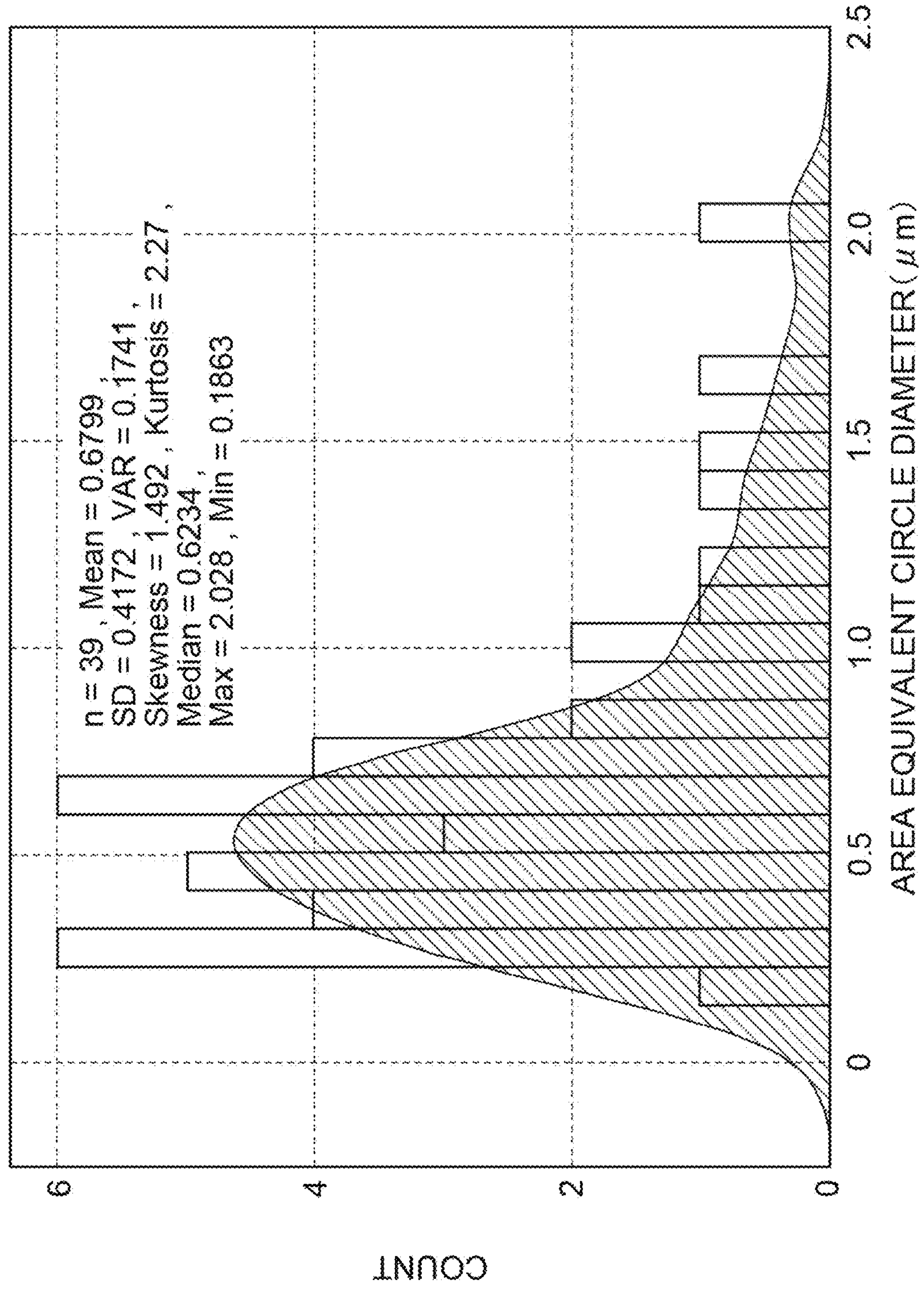
FIG. 9 is a view illustrating a distribution of area equivalent circle diameters of the electrode discontinuity portions in the second sample.

FIG. 8 and FIG. 9 are views illustrating the distribution of the area equivalent circle diameters of the discontinuity portions 6 in the first sample and the second sample, respectively. As shown in FIG. 8 and FIG. 9, both distributions are skewed to a right side of the drawings (biased to the left side). In the distribution of the first sample, the number of data n was 51, a mean value (Mean) was 1.313 μm, a standard deviation (SD) was 0.8947 μm, a variance (VAR) was 0.8005, a skewness was 1.681, a kurtosis was 2.572, a median value (Median) was 1.107, a maximum value (Max) was 4.14 μm, and a minimum value (Min) was 0.3383 μm. In the distribution of the second sample, the number of data n was 39, the mean value (Mean) was 0.6799 μm, the standard deviation (SD) was 0.4172 μm, the variance (VAR) was 0.1741, the skewness was 1.492, the kurtosis was 2.27, the median value (Median) was 0.6234, the maximum value (Max) was 2.028 μm, and the minimum value (Min) was 0.1863 μm. In this way, the number of data may be, for example, 30 or more.

Figure 10:
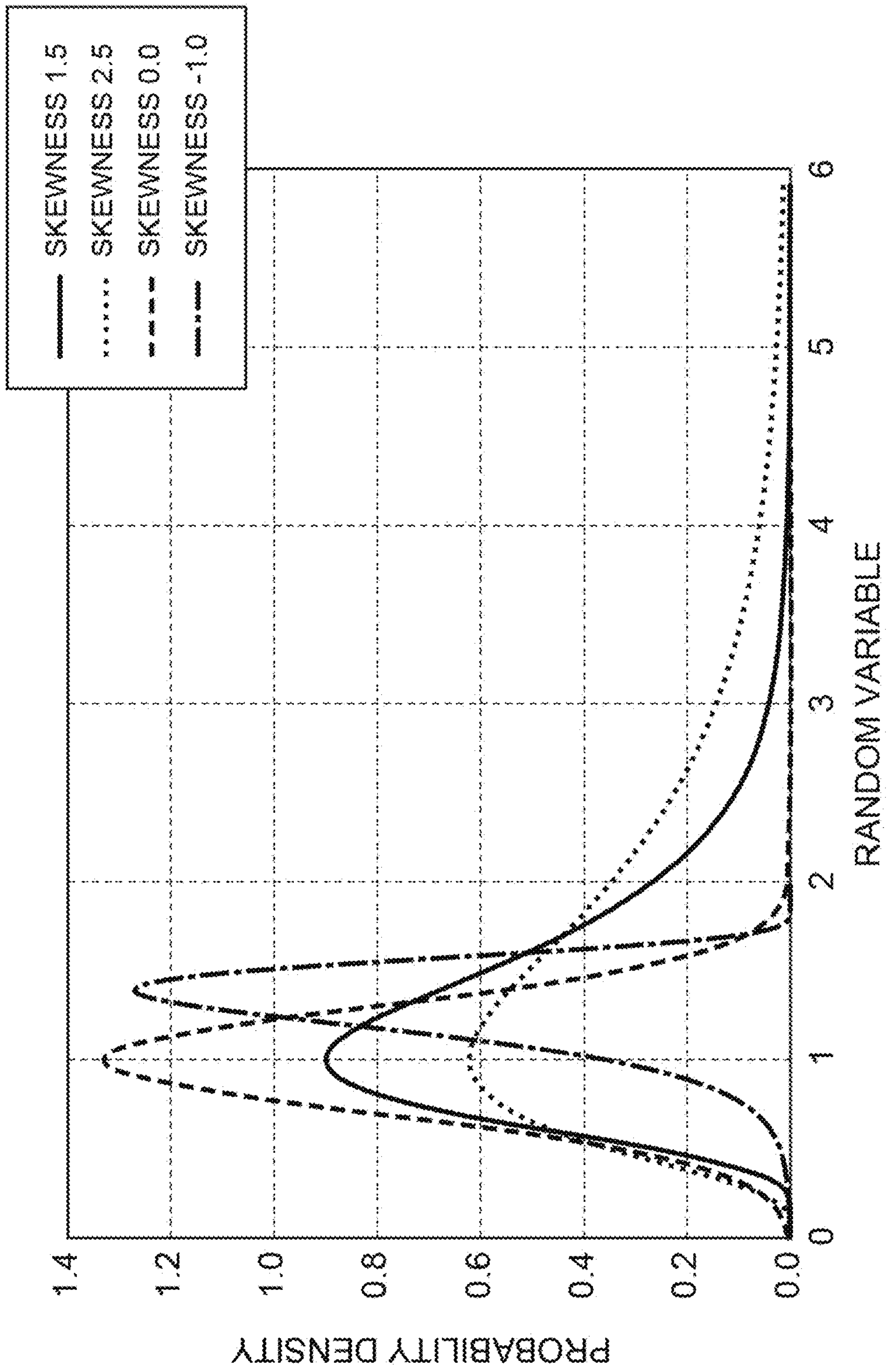
FIG. 10 is a graph illustrating a skewness.

FIG. 10 is a graph for explaining the skewness. The skewness A of a probability distribution that a random variable X follows is defined by Formula (1). In Formula (1), E (X) represents an expected value of the random variable X, μ is the mean value of the random variable X, and σ is the standard deviation of the random variable X. The skewness is an index of asymmetry, and is zero when the probability distribution is a normal distribution.

$$A = \frac{E(X-\mu)^3}{\sigma^3} \tag{1}$$

FIG. 10 shows four probability distributions in which the degrees of skew are 1.5, 2.5, 0.0, and −1.0, respectively. As illustrated in FIG. 10, the larger the skewness, the further the distribution is biased to the left (a side where the random variable is small) and the longer the tail on the right side of the distribution (a side where the random variable is large). Therefore, events with large random variables corresponding to the right side of the distribution are likely to occur. On the other hand, the smaller the skewness, the further the distribution is biased to the right and the longer the tail on the left side of the distribution. Therefore, events with small random variables corresponding to the left side of the distribution are likely to occur.

In the multilayer electronic component 1, the skewness of the distribution of the area equivalent circle diameters of the plurality of discontinuity portions 6 formed in the electrode layer 4 on the observation surface (a plane intersecting (orthogonal to) the first direction D1 in this example) is 1 or more and 2 or less. For example, the skewness of the distribution of the first sample is 1.681, and the skewness of the distribution of the second sample is 1.492. That is, the distribution of the area equivalent circle diameters of the discontinuity portions 6 is biased to the left, and many small discontinuity portions 6 and a few large discontinuity portions 6 are formed in the electrode layers 4. According to this, it is possible to arrange the discontinuity portions 6 as shown in FIG. 2C, and it is possible to suppress occurrence of cracks while suppressing a decrease in electrostatic capacitance.

Note that, in the above example, the observation surface is the boundary surface between the dielectric layer 3 and the electrode layer 4, but it is considered that the discontinuity portions 6 are also formed inside the electrode layer 4. In other words, even in a case of measuring the skewness of the distribution of the area equivalent circle diameters of the plurality of discontinuity portions 6 formed in the electrode layer 4 on a plane located inside the electrode layer 4 and intersecting (for example, orthogonal to) the first direction D1, it is considered that the skewness is 1 or more and 2 or less.

The skewness of the distribution of the area equivalent circle diameters of the discontinuity portions 6 may be adjusted, for example, by the manufacturing method. For example, organic powders with various sizes that are not dissolved in a solvent (for example, polyvinyl alcohol, or the like) are mixed into a conductive paste that is used in the stacking process described above and becomes the electrode layer 4 after firing. According to this, the organic powders are burned off during firing, and voids (discontinuity portions 6) according to the sizes of the powders may be formed.

FIG. 11A, FIG. 11B, FIG. 12A, and FIG. 12B are tables showing results of a first experiment, a second experiment, a third experiment, and a fourth experiment, respectively. The first experiment targeted Examples 1 to 3 and Comparative Examples 1 to 3. A "ratio of discontinuity portions" represents a ratio of the total area of the discontinuity portions 6 to an area of the electrode layer 4 on the observation surface. An "electrostatic capacitance" is a value measured by an LCR meter after forming the external electrodes 5 on the outer surface of the element body 2 corresponding to each sample. The "electrostatic capacitance" is expressed as a relative value in which a case where the ratio of the discontinuity portions is 0 (coverage rate is 100%) is set as a reference (value of 1.00). The electrostatic capacitance is preferably 0.9 or more, more preferably 0.95 or more, and still more preferably 0.98 or more. "Crack" is a ratio of the number of cracks found when a pressure cooker test (temperature: 121° C., relative humidity: 95% RH, and exposure time: 24 hours) was performed on the element body 2 (without external electrodes 5) corresponding to each sample, and the appearance was confirmed with a stereomicroscope. These points are also true of the second to fourth experiments.

As shown in the table of FIG. 11A, cracks occurred in Comparative Example 1 where the discontinuity portions 6 are not formed and Comparative Example 2 where the skewness is 0.80. In Comparative Example 3 where the skewness is 2.33, the electrostatic capacitance was less than 0.9. In contrast, in the first, second, and third examples where the skewnesses are 1.17, 1.57 and 1.88, respectively, the electrostatic capacitance was 0.9 or more, and cracks did not occur. From this, it can be seen that when setting the skewness is 1 or more and 2 or less, it is possible to suppress occurrence of cracks while suppressing a decrease in electrostatic capacitance.

The second experiment targeted Examples 4 to 8. From the table of FIG. 11B, it can be seen that the electrostatic capacitance increases as the median value of the area equivalent circle diameters of the discontinuity portions 6 decreases. The median value of the area equivalent circle diameters of the discontinuity portions 6 is preferably 1.5 μm or less, and more preferably 0.5 μm or less.

The third experiment targeted Examples 9 to 12. "Crack 1" is the same as "Crack" in the first experiment. "Crack 2" is a ratio of the number of cracks found when a pressure cooker test (temperature: 121° C., relative humidity: 95% RH, and exposure time: 100 hours) was performed on the element body 2 (without external electrodes 5) corresponding to each sample, and the appearance was confirmed with a stereomicroscope. These points are also true of the fourth experiment.

As shown in the table of FIG. 12A, in Example 9 in which the standard deviation of the area equivalent circle diameters of the discontinuity portions 6 is 0.25 μm, cracks occurred in a test for Crack 2. In contrast, in Examples 10, 11, and 12 in which the standard deviations are 0.38 μm, 1.41 μm, and 1.7 μm, respectively, no crack occurred in the test for Crack 2. From this viewpoint, it is preferable that the standard deviation of the area equivalent circle diameters of the discontinuity portions 6 are 0.3 μm or more. In addition, in Example 12 in which the standard deviation is 1.7 μm, the electrostatic capacitance was 0.93 that is lower as compared with Examples 9 to 11. From this viewpoint, it is preferable that the standard deviation of the area equivalent circle diameters of the discontinuity portions 6 are 1.5 μm or less. That is, it is preferable that the standard deviation is 0.3 μm or more and 1.5 μm or less.

The fourth experiment targeted Examples 13 to 16. From the table of FIG. 12B, in Example 13 in which the ratio of the discontinuity portions 6 is 0.04, cracks occurred in the test for Crack 2. In contrast, in Examples 14, 15, and 16 in which the ratios of the discontinuity portion 6 are 0.06, 0, 14, and 0.18, respectively, cracks did not occur in the test for Crack 2. From this viewpoint, it is preferable that the ratio of the discontinuity portions 6 is 0.05 (5%) or more. Moreover, in Example 16 in which the ratio of the discontinuity portions 6 is 0.18, the electrostatic capacitance was 0.92 that is lower as compared with Examples 13 to 16. From this viewpoint, it is preferable that the ratio of the discontinuity portions 6 is 0.15 (15%) or less. That is, it is preferable that the ratio of the discontinuity portions 6 is 5% or more and 15% or less.

Function and Effect

In the multilayer electronic component 1, the skewness of the distribution of the area equivalent circle diameters of the plurality of discontinuity portions 6 (electrode discontinuity portions) (voids) formed in the electrode layer 4 is 1 or more and 2 or less. That is, many small discontinuity portions 6 and a few large discontinuity portions 6 are formed in the electrode layers 4. When the discontinuity portions 6 are formed in the electrode layers 4, a stress generated during firing due to a difference in a linear expansion coefficient between the dielectric layer 3 and the electrode layer 4 may be mitigated, and occurrence of cracks may be suppressed. In a case where the discontinuity portions 6 are small, an influence of stray capacitance is relatively large, and thus the electrostatic capacitance is less likely to decrease significantly, but a stress mitigation effect is relatively small. On the other hand, in a case where the discontinuity portions 6 are large, the influence of the stray capacitance is relatively small, and thus the electrostatic capacitance may decrease, but the stress mitigation effect is relatively large. In the multilayer electronic component 1, many small discontinuity portions 6 and a few large discontinuity portions 6 are formed in the electrode layers 4, and thus occurrence of cracks can be suppressed while suppressing a decrease in electrostatic capacitance.

The median value of the area equivalent circle diameters of the discontinuity portions 6 may be 1.5 μm or less, or may be 0.5 μm or less. In this case, many small discontinuity portions 6 can be arranged in the electrode layers 4, and a decrease in electrostatic capacitance can be effectively suppressed.

The standard deviation of the area equivalent circle diameters of the discontinuity portions 6 may be 0.3 μm or more and 1.5 μm or less. In this case, when the standard deviation is 0.3 μm or more, occurrence of cracks can be reliably suppressed. In addition, when the standard deviation is 1.5 μm or less, a decrease in electrostatic capacitance can be reliably suppressed.

The ratio of the discontinuity portions 6 to the area of the electrode layers 4 on the observation surface may be 5% or more and 15% or less. In this case, when the ratio is 5% or more, occurrence of cracks can be reliably suppressed. In addition, when the ratio is 15% or less, a decrease in electrostatic capacitance can be reliably suppressed.

The present disclosure is not limited to the above-described embodiment and modification examples. For example, materials and shapes of the respective configurations are not limited to those described above, and various materials and shapes can be employed. The multilayer electronic component 1 may be a multilayer piezoelectric actuator, a multilayer varistor, a multilayer thermistor, a multilayer composite component, or the like.

What is claimed is:

1. A multilayer electronic component, comprising:

a plurality of dielectric layers; and a plurality of electrode layers stacked alternately with the plurality of dielectric layers along a stacking direction, wherein a skewness of a distribution of area equivalent circle diameters of a plurality of electrode discontinuity portions formed in the electrode layer on a plane intersecting the stacking direction is 1 or more and 2 or less.

2. The multilayer electronic component according to claim 1, wherein a median value of the area equivalent circle diameters of the plurality of discontinuity portions is 1.5 μm or less.

3. The multilayer electronic component according to claim 1, wherein a median value of the area equivalent circle diameters of the plurality of discontinuity portions is 0.5 μm or less.

4. The multilayer electronic component according to claim 1, wherein a standard deviation of the area equivalent circle diameters of the plurality of discontinuity portions is 0.3 or more and 1.5 μm or less.

5. The multilayer electronic component according to claim 1, wherein a ratio of the plurality of discontinuity portions to an area of the electrode layer on the plane is 5% or more and 15% or less.

* * * * *